United States Patent [19]
Yokoyama et al.

[11] Patent Number: 5,319,720
[45] Date of Patent: Jun. 7, 1994

[54] APPEARANCE INSPECTING METHOD

[75] Inventors: Haruhiko Yokoyama, Osaka; Masaya Nakao, Kadoma, both of Japan

[73] Assignee: Matsushita Electric Industrial Co., Ltd., Osaka, Japan

[21] Appl. No.: 913,190

[22] Filed: Jul. 14, 1992

[30] Foreign Application Priority Data

Jul. 17, 1991 [JP] Japan ................... 3-176459

[51] Int. Cl.$^5$ .............................. G06K 9/00
[52] U.S. Cl. ........................... 382/8; 382/9; 382/22
[58] Field of Search ............ 382/22, 28, 8, 9; 358/106, 107

[56] References Cited

U.S. PATENT DOCUMENTS

4,720,869  1/1988  Wadia .................. 382/22

*Primary Examiner*—Leo H. Boudreau
*Attorney, Agent, or Firm*—Wenderoth, Lind & Ponack

[57] ABSTRACT

An appearance inspecting method includes the steps of dividing a recognized image of an object into regions based on two attributes of image points within the image calculating the minimum distance of each point within a target region to a periphery of the target region, and measuring a size of the target region from the maximum of the calculated minimum distances of the points in the target region. A distance measuring method for measuring a distance of each point within a region to a periphery of the region includes the steps of dividing each region to be measured by lines made of picture elements arranged in one direction, sequentially integrating the distance of each point from the periphery of the region from its outer side to a middle point in each line from one end line to the other end line of the region to thereby obtain the minimum distance of each point, and the distance of each point from the periphery of the region is sequentially integrated from its outer side to the middle point in each line from the other end line to the one end line of the region to thereby obtain the minimum distance of each point.

12 Claims, 5 Drawing Sheets

APPEARANCE INSPECTING METHOD

BACKGROUND OF THE INVENTION

The present invention relates to an inspecting method for inspecting the appearance, for example, processing irregularity of the surface of an object such as electronic parts, e.g. capacitors and a distance measuring method used for the inspecting method.

A specific example of a previously used appearance inspecting method will be described.

A UF capacitor is a kind of chip capacitor, which is applied with an ultraviolet curing resin on the surface thereof (referred to as an applied surface) coming in contact with a substrate when mounted, for the purpose of insulation and protection. If the resin is not applied sufficiently, the capacitor is judged to have poor wetting. A region of the capacitor where the resin is fully applied is called a wetting part, and a region thereof where the resin is not applied enough is called a poor wetting part. In the conventional example, the whole area of the poor wetting part is calculated and it is assumed that when the size of the area of the poor wetting part is within a predetermined allowable value, the capacitor is decided to be acceptable. On the other hand, if the size exceeds the predetermined allowable value, the capacitor is decided to be unacceptable.

Figure 11A:
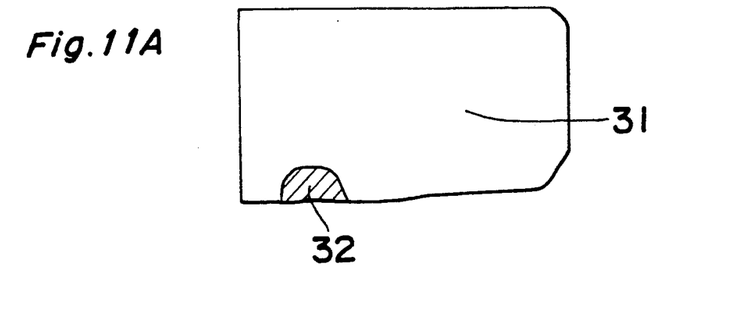
FIGS. 11A and 11B are diagrams of applied surfaces of UF capacitors for explaining the conventional method.
Figure 11B:
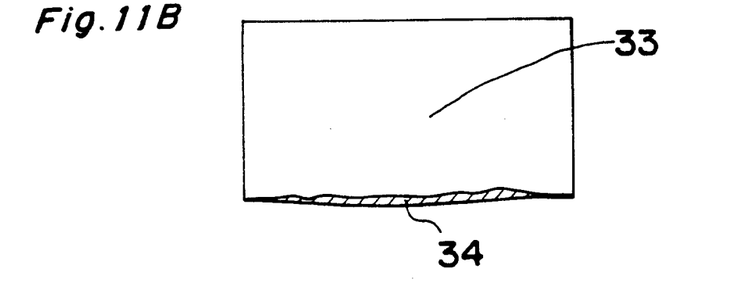

According to a conventional method, however, the acceptability of the applied surface of the UF capacitor is determined based only by the size of the whole area of the poor wetting part, and the resulting decision may be different from the decision an operator would make. For example, in FIGS. 11A and 11B wherein reference numerals 31 and 33 denote wetting parts and 32 and 34 denote poor wetting parts, assuming the size of the area of the poor wetting part 32 in FIG. 11A is larger than a predetermined value it is decided that it is unacceptable and an operator would judge similarly. On the other hand, assuming the size of the area of the poor wetting part 34 in FIG. 11B is also larger than the predetermined value, it is decided that it is unacceptable, but the decision of the operator would acceptable because the actual poor wetting part is very small at the periphery of the UF capacitor.

SUMMARY OF THE INVENTION

The object of the present invention is therefore to provide an appearance inspecting method capable of shortening the processing time through high speed operation and improving the accuracy of the acceptability decision and also to provide a distance measuring method of a short processing time used in the appearance inspecting method.

In accomplishing these and other objects, according to one aspect of the present invention, there is provided an appearance inspecting method comprising the steps of:

dividing a recognized image of an object into two colors attributes of points within the image;

calculating the minimum distance of each point within a target region to a periphery of in the target region; and measuring a size of the target region from the maximum of the calculated minimum distances of the points in the target region.

According to another aspect of the present invention, there is provided a distance measuring method for measuring a distance of each point within a region to a periphery of the region, which comprises the steps of:

dividing each region to be measured by lines made of picture elements arranged in one direction; and sequentially integrating the distance of each point from the periphery of the region from its outer side to a middle point in each line from one end line to the other end line of the region to thereby obtain the minimum distance of each point, and the distance of each point from the periphery of the region is sequentially integrated from its outer side to the middle point in each line from the other end line to the one end line of the region to thereby obtain the minimum distance of each point.

BRIEF DESCRIPTION OF THE DRAWINGS

These and other objects and features of the present invention will become clear from the following description taken in conjunction with the preferred embodiment thereof with reference to the accompanying drawings in which.

DETAILED DESCRIPTION OF THE PREFERRED EMBODIMENT

Before the description of the present invention proceeds, it is to be noted that like parts are designated by like reference numerals throughout the accompanying drawings.

A preferred embodiment of the present invention will be discussed hereinbelow with reference to FIGS. 1 through 8.

Figure 1:
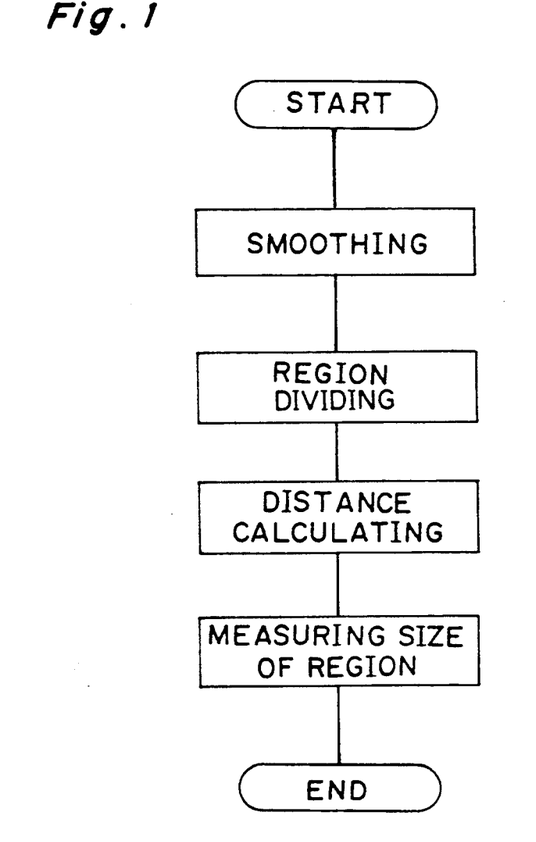
FIG. 1 a flow chart of the overall process in an appearance inspecting method according to one preferred embodiment of the present invention.

Referring to a flow chart of FIG. 1 showing the overall process of an appearance inspecting method of the embodiment, image signals inputted via a TV camera are smoothed in step #1 after being turned to a finite number of digital image data by sampling (digitizing) and A/D conversion with use of a computer. The digital image data is divided into regions on the basis of the color information in step #2. The distance of a target region is calculated in step #3 and the size of the region is measured in step #4. Each process will be described below in detail.

Smoothing process

Figure 2:
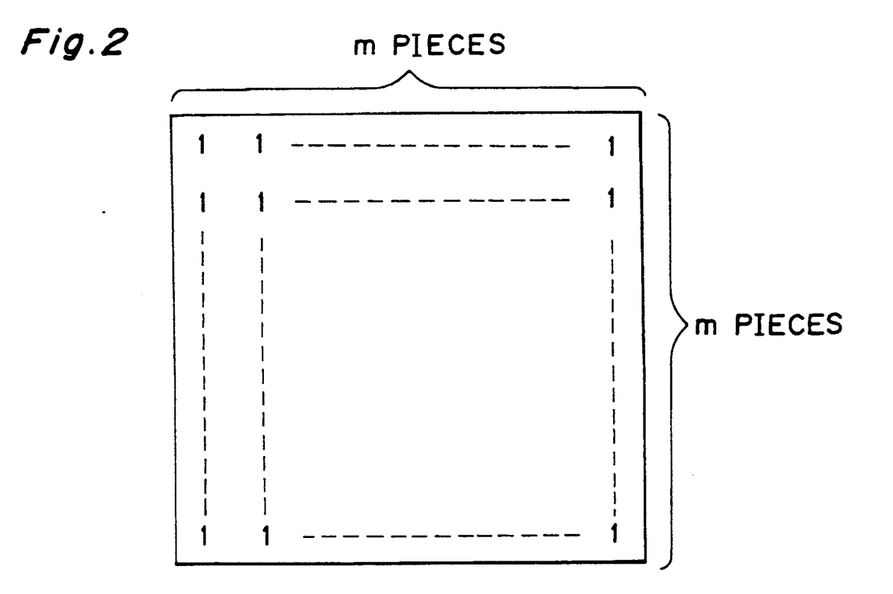
FIG. 2 is a diagram explanatory of a mask operator used in a smoothing process.

Smoothing is achieved by a convolution operation using a smoothing mask operator shown in FIG. 2, i.e., by calculating the mean of local sections.

Supposing that the original image data is expressed by $\{P(i, j) | 1 \leq i \leq N, 1 \leq j \leq M\}$ wherein i, j are axes of abscissa and ordinate, of the image and N, M are the size of the image frame, the smoothed image data $\{Q(k,l) | 1 \leq k \leq N, 1 \leq l \leq M\}$ is obtained according to a formula (3) below:

$$Q(k,l) = \sum_{0 < i,j < m} P(k - m/2 + i, l - m/2 + j) \quad (3)$$

wherein m is the size of the mask operator.

Dividing process into region

Figure 3:
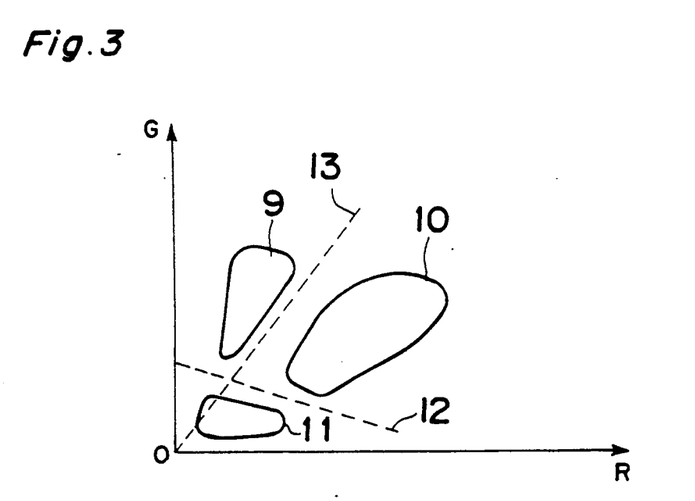
FIG. 3 is a graph of the color distribution of a UF capacitor.
Figure 10:
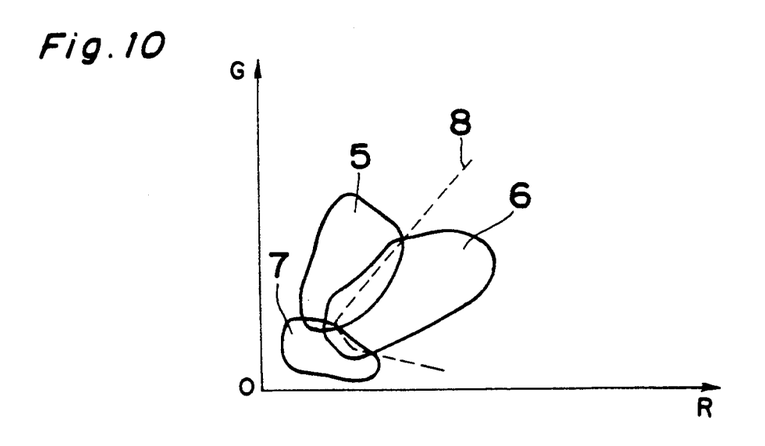
FIG. 10 is a graph of the color distribution of a UF capacitor in a conventional example.

FIG. 3 is a graph of the color distribution of a UF capacitor, in which an axis of abscissa is an R axis (R being the quantity of red components) and an axis of ordinate is a G axis (G being the quantity of green components) similar to FIG. 10. Reference numerals 9, 10, and 11 indicate respectively the color distribution of a wetting part, the color distribution of a poor wetting part, and the color distribution of the background part (unseen area of the capacitor). As is clear from FIG. 3, each region of the color distribution is clearly distinguished from one another due to the smoothing process described above without being influenced by color irregularity and/or density irregularity. A line 12 separates the wetting part 9 and the poor wetting part 10 from the background part 11. A line 13 separates the wetting part 9 and the poor wetting part 10.

The lines 12 and 13 satisfy the following equations (4) and (5):

$$k_1 * r + l_1 * g = s_1 \quad (4)$$

$$k_2 * r + l_2 * g = s_2 \quad (5)$$

In the equations, "r" indicates the size of R components, and "g" indicates the size of G components.

When R and G components of the image obtained in the smoothing process are denoted by R and G, respectively, dividing of the image into regions is carried out in a manner described hereinbelow.

1) $A1 = k_1 * R + l_1 * G$ is operated according to above equation (4).

2) A1 is turned into two digits by a threshold value $s_1$, thereby to obtain B1.

As a result, the target region of the capacitor is detected.

3) $A2 = k_2 * R + l_2 * G$ is operated according to above equation (5).

4) A2 is converted to two digits by a threshold value $s_2$, thereby to obtain B2.

5) A product of B1 and B2 is calculated.

Accordingly, the poor wetting part is detected.

Distance calculating process

An image distance determined for the poor wetting part obtained in the region dividing process. The image distance referred to above is obtained by calculating the distance of each point within the region from the periphery. Although it is necessary to calculate the distance sequentially from the shortest point from the periphery, the processing time is lengthy, and therefore, the embodiment executes a high speed calculation, which will be described with reference to FIGS. 4 to 6.

Figure 4:
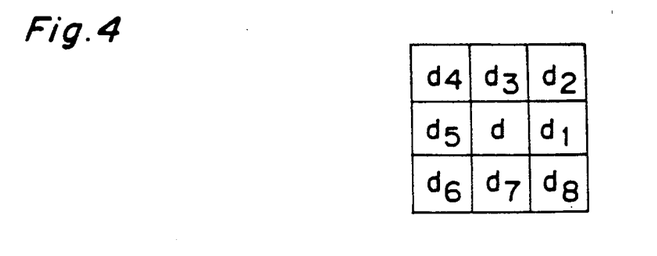
FIG. 4 is a diagram of codes of eight neighborhood points.
Figure 5:
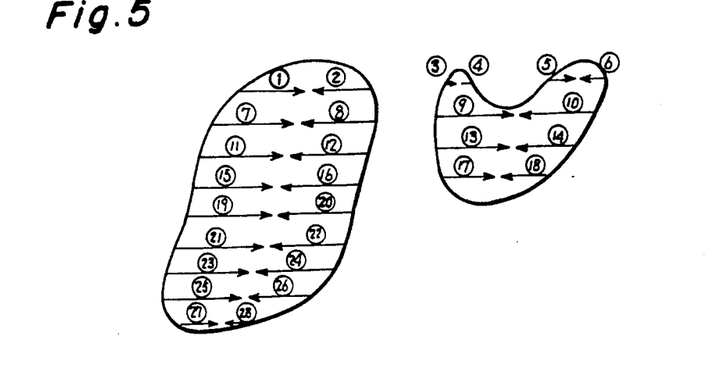
FIG. 5 is a diagram explanatory of the processing order when the distance is calculated.
Figure 6:
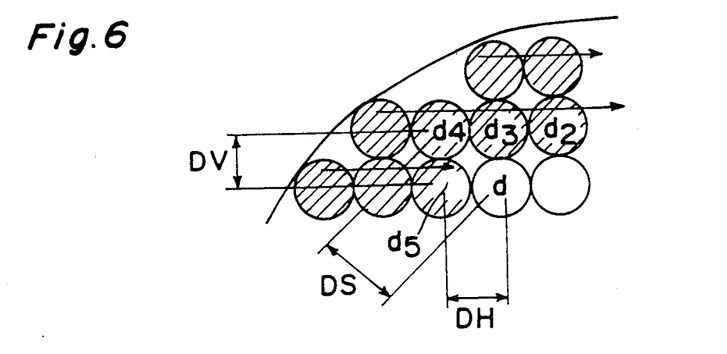
FIG. 6 is a diagram explanatory of a distance measuring method.

More specifically, FIG. 4 is a table of codes of eight neighborhood points of a target point d. FIG. 5 shows the processing order when two objective regions are present. FIG. 6 is explanatory of the calculating method of the distance. The distance is calculated in accordance with process 1) to 3) hereinbelow.

1) Zero is loaded in every element in an array of the distance data.

2) The following treatment is conducted for each line of the poor wetting part from the uppermost line to a lower one as indicated in FIG. 5. Each line is made of an array of picture elements arranged in one direction.

(i) The distance data is sequentially calculated according to an equation (6) below for a continuous part where the poor wetting part exists continuously in a target line (referred to as a "run" hereinafter) from the left end to a middle point of the line.

$$d = \min(d_2 + DS, d_3 + DV, d_4 + DS, d_5 + DH) \quad (6)$$

As shown in FIG. 6, "d" is the distance from the periphery of the target point, "DH" is the distance between the target point and an adjacent neighborhood point in the horizontal direction, "DV" is the distance between the target point and an adjacent neighborhood point in the vertical direction, and "DS" is the distance from the target point to an adjacent neighborhood point in the slantwise direction. The points indicated by oblique lines in FIG. 6 are already calculated. The minimum value of the added distances of the above distances DH, DV, and DS to the already calculated distances $d_2$, $d_3$, $d_4$, and $d_5$ is the distance of d.

(ii) Similarly, the distance data from the right end to the middle point of the run of the poor wetting part in the target line is calculated in accordance with an equation (7) below.

$$d = \min(d_1 + DH, d_2 + DS, d_3 + DV, d_4 + DS) \quad (7)$$

In the case where a plurality of runs are present, (i) and (ii) are carried out for every run.

3) The poor wetting part is then processed as described hereinbelow sequentially from the lowest line to an upper one.

(iii) The distance data is calculated from the left end to the middle point of the run of the poor wetting part in the target line according to an equation (8).

$$d = \min(d, d_5 + DH, d_6 + DS, d_7 + DV, d_8 + DS) \quad (8)$$

(iv) The distance data from the right end to the middle point of the run of the poor wetting part in the target line is calculated according to an equation (9).

$$d = \min(d, d_6 + DS, d_7 + DV, d_8 + DS, d_1 + DH) \quad (9)$$

If there are a plurality of runs, process (iii) and (iv) are performed for every run.

In the present embodiment, it is assumed that when the radius of the largest inscribed circle of the poor wetting part is within a predetermined allowable value, the capacitor is decided to be acceptable. On the other hand, if the radius exceeds the predetermined allowable value, the capacitor is decided to be unacceptable.

The above method is much simplified as compared with a conventional method, and as will be explained hereinafter that the above method ensures a correct result.

Figure 7:
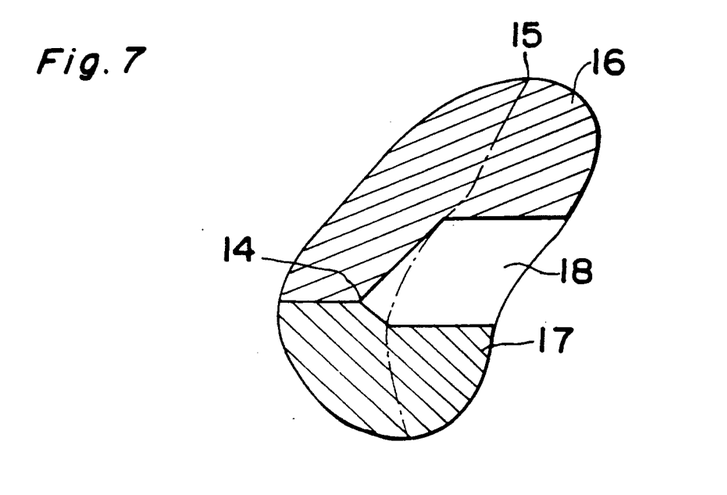
FIG. 7 is a diagram of an example of a poor wetting part.
Figure 8:
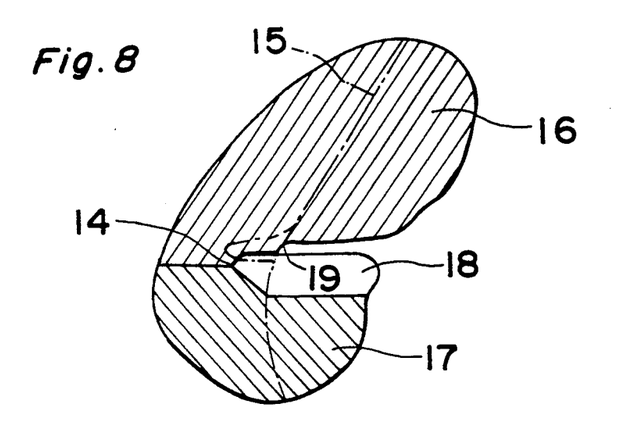
FIG. 8 is a diagram of another example of a poor wetting part.

FIG. 7 is an example of a pattern of the poor wetting part, in which reference numerals 14 and 15 indicate a target point and a series of middle points of runs, and a part indicated by oblique lines 16 is a set of points used to determine the distance of the target point 14 when the procedure up to the above process 2) is finished. A part of oblique lines 17 is a set of points related to the determination of the distance of the target point 14 before the process 3) is completed after the process 2). A white area 18 is a set of points not related to the distance determination of the target point 14. FIG. 8 shows another example of a pattern of the poor wetting part, intended to clarify that the distance can be measured correctly even when a recessed part is present in the vicinity of a target point.

It is apparent from FIG. 7 that the white part 18 occupies only a small area. Therefore, the points inside the area 18 are not required for determination of the distance. For instance, even when the distance of the target point is short because of the presence of the recessed part in the vicinity of the target point as shown in FIG. 8, the distance can be calculated from a bottom point 19 of the recessed part.

Measuring process of size of region

The size of a region is determined by the maximum value of the distances calculated in the distance calculating process.

The above-described method makes it possible to reduce the processing time remarkably. The processing time of the data referred to earlier with respect to the following reference method will be calculated in the present invention as follows.

Time to divide the wetting part, poor wetting part, and background into regions

T1=33msec (to smooth R components of the image)
T2=33msec (to smooth G components of the image)
T3=33msec (to calculate A1=$k_1$* R+$l_1$* G)
T4=33msec (to convert A1 to two digits (to obtain B1))
T5=33msec (to calculate A2=$k_2$ * R+$l_2$ * G)
T6=33msec (to convert A2 to two digits (to obtain B2))
T7=33msec (to calculate a product of B1 and B2)

Time to calculate the distance

T8=5000×8(D)×10(S)×0.5μsec=200msec

It is to be noted that D=5000×8 in the calculation of T8 means "(the number of points in the poor wetting part)×(the number of neighborhood points referred to for every point)".

Accordingly, the processing time T according to the present embodiment is:

$$T=T1+T2+T3+T4+T5+T6+T7+T8=431\text{msec}$$

As compared with the above process, the reference process will be described below with reference to FIGS. 9 and 10.

Figure 9:
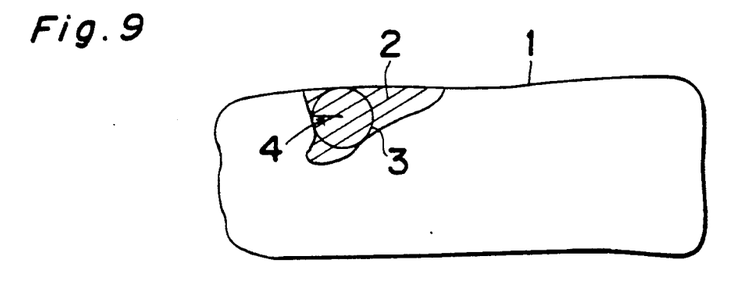
FIG. 9 is a diagram of an applied surface of a UF capacitor.

FIG. 9 shows the applied surface of a UF capacitor, in which reference numerals respectively indicate: 1 the configuration of the UF capacitor; 2 a poor wetting part of the capacitor; 3 the largest inscribed circle of the poor wetting part 2; and 4 the radius of the largest inscribed circle 3.

FIG. 10 is a graph of the color distribution of the UF capacitor. An axis of abscissa is an R axis (R being the quantity of ref components) and an axis of ordinate is a G axis (G being the quantity of green components). It is to be noted here that the above color distribution is obtained by plotting each quantity of red components and green components at each point of the regions on the axis of abscissa and axis of ordinate. In FIG. 10, reference numerals 5, 6, 7, and 8 are respectively the color distribution in the wetting part, the color distribution of the poor wetting part 2, the color distribution of the background (unseen area of the capacitor), and a line separating the color distribution 6 of the poor wetting part from the color distributions 5 and 7 of the other parts in a manner the the color distribution 6 is least overlapped with the color distributions 5 and 7.

Conventionally, an image of an object to be inspected is input via a TV camera, subjected to sampling (digitizing) and A/D conversion, and finally processed as a finite number of digital data by a computer.

The poor wetting part is divided into regions with use of the line 8 of FIG. 10. The shortest distance of each point to the periphery of the divided region of the poor wetting part is obtained. The maximum value of the shortest distances, i.e., the radius of the largest inscribed circle is defected.

For example, supporting that the size of the image data is 500×500, the poor wetting part is a 50×100 rectangle, and the computer processes at 2MIPS speed (0.5μsec for one processing instruction), the processing time will be roughly estimated as follows.

When the number of data to be processed is "D" and the number of instructions for processing one data is "S", the processing time is calculated according to a formula (D×S×0.5μsec). Therefore, the equations (1) and (2) below are held.

Time to divide the wetting part, poor wetting part, background part into regions $$T1=250000(D)\times 20(S)\times 0.5\mu\text{sec}=2.5\text{sec} \quad (1)$$

Time to calculate the distance $$T2=5000\times 130(D)\times 10(S)\times 0.5\mu\text{sec}=3.25\text{sec} \quad (2)$$

D=5000×130 in the equation (2) stands for "(the number of points in the poor wetting part)×(the average of areas of inscribed circles of the points)".

Accordingly, the total processing time T becomes:

$$T=T1+T2=5.75\text{sec}$$

Therefore, the processing time of the embodiment is 1/13 the time required in the reference method, i.e., 1/13 of 5.75sec.

Figure 12A:
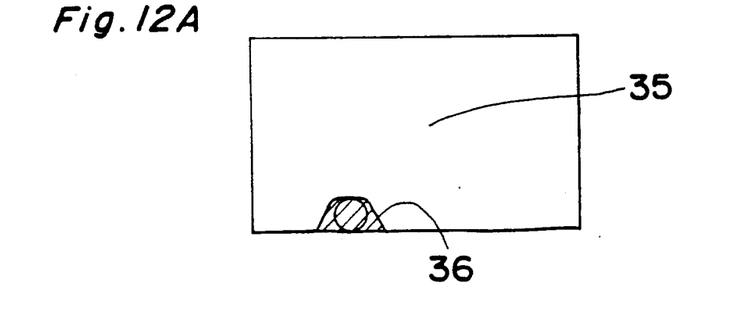
FIGS. 12A and 12B are diagrams of applied surfaces of UF capacitors for explaining the embodiment.
Figure 12B:
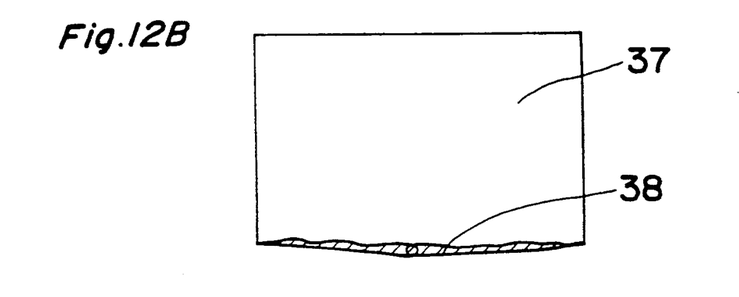

According to the embodiment, an image of an object is divided into regions based on two color components of hue, the minimum distance of each point from its periphery within a target region is calculated, and a size of the target region from the maximum of the calculated minimum distances of the points in the target region is measured. Therefore, the size of the poor wetting part can be determined by the maximum value of the distances calculated, and thus the processing time therefor can be greatly reduced. For example, in FIGS. 12A and 12B wherein reference numerals 35 and 37 denote wetting parts and 36 and 38 denote poor wetting part, when the radius of the inscribed circle of the poor wetting part in FIG. 12A is larger than a predetermined value, it is decided that it is unacceptable, and when the radius of the poor wetting part in FIG. 12B is smaller than the predetermined value, it is decided that it is acceptable. This decision of the acceptance is the same as the operator's decision, and thus the accuracy of the decision can be improved.

As is described hereinabove, even if the brightness of an image of an object is not uniform because of the surface roughness or the like, the size of an unacceptable processing part of the object can be correctly measured by the appearance inspecting method of the present embodiment and the processing time therefor can be greatly reduced because of the combination of the smoothing process and the dividing process based on the color information.

According to the reference method, both the wetting part and the poor wetting part have irregularity in color and density which result from the various reflecting states at each point of the parts due to the surface roughness, painting irregularity or noises of electric signals. Therefore, if the wetting part and the poor wetting part are divided into regions by the line 8 of FIG. 10, many points may be decided as included in the poor wetting part although they should be decided to be inside the wetting part. The reverse may be also true in many cases that the points which should be detected to be inside the poor wetting part are decided to be included in the wetting part. As a result, the radius of the largest inscribed circle may be measured erroneously. Contrary to the above reference method, in the embodiment, as is clear from FIG. 3, each region of the color distribution can be clearly distinguished from one another due to the smoothing process without being influenced by the color irregularity and/or density irregularity.

Moreover, the distance of each point from the periphery in any region can be calculated in a short processing time according to the distance measuring method of the present embodiment.

In the dividing step, instead of using two different hue components as the two color attributes, two of a single hue component saturation, and lightness may be used. For example, a graph of distribution of a UF capacitor may be made for dividing the wetting part, poor wetting part, and background part into regions, in which an axis of abscissa is a saturation and an axis of ordinate is a lightness.

Although the present invention has been fully described in connection with the preferred embodiments thereof with reference to the accompanying drawings, it is to be noted that various changes and modifications are apparent to those skilled in the art. Such changes and modifications are to be understood as included within the scope of the present invention as defined by the appended claims unless they depart therefrom.

What is claimed is:

1. A computer implemented object inspection method comprising the steps of:

viewing the object with a camera to obtain a colorized image of an image frame including the object and digitizing the colonized image to obtain color image data of image points within the image frame including the object;

dividing the image frame including the object into different image regions based on at least two color attributes represented by the color image cata at the image points within the image frame, wherein at least one of said image regions is a target image region of the object;

calculating a minimum distance from each image point contained in the target image region of the object to a periphery of the target image region of the object to obtain a plurality of minimum distances respectively associated with the image points within the target image region of the object;

determining a maximum distances from among the plurality of minimum distance; and, judging an acceptability of the object based on the maximum distance.

2. A computer implemented object inspection method as claimed in claim 1, further comprising a smoothing process step, executed before said dividing step, of determining a means value of localized image sections of the image frame and generating the color image at according to the mean value of the localized image sections.

3. A computer implemented object inspection method as claimed in claim 1, further comprising a smoothing process step, executed before said dividing sep, of determining a means value of localized image sections of the image frame and generating the color image data according to the means value of the localized image sections, and wherein said calculating step includes (1) dividing the target image region by parallel lines each containing image points arranged in one direction, the parallel lines including one end line at one end of the target region and another end line at the other end of the target region, (2) sequentially calculating, for each line in succession from the one end line to the other end line, a distance for each image point from ends of each line to a middle of each line to obtain a minimum distance or each image point, and (3) sequentially calculating, or each line in succession from the other end line to the one end line, a distance for each image point from ends of each line to a middle of each line to obtain a minimum distance for each image point.

4. A computer implemented object inspection method as claimed in claim 1, wherein said calculating step includes (1) dividing the target region by parallel lines each containing image points arrange in one direction, the parallel lines including one end line at one end of the target region and another end line at the other end of the target region, (2) sequentially calculating, for each line in succession from the one end line to the other end line, a distance for each image point from ends of each line to a middle of each line to obtain a minimum distance for each image point, and (3) sequentially calculating, for each line in succession rom the other end line to the one end line, a distance for each image point from ends of each line to a middle of each line to obtain a minimum distance for each image point.

5. A computer implemented object inspection method as claimed in claim 1, wherein said at least two color attributes includes two different hues.

6. A computer implemented object inspection method as claimed in claim 2, wherein said at least two color attributes include two different hues.

7. A computer implemented object inspection method as claimed in claim 3, wherein said at least two color attributes includes two different hues.

8. A computer implemented object inspection method as claimed in claim 4, wherein said at least two color attributes include two different hues.

9. A computer implemented object inspection method as claimed in claim 1, wherein said at least two color attributes includes two of a hue, a saturation and a lightness.

10. A computer implemented object inspection method as claimed in claim 2, wherein said at least two color attributes include two of a hue, a saturation and a lightness.

11. A computer implemented object inspection method as claimed in claim 3, wherein said at least two color attributes include two of a hue, saturation and a lightness.

12. A computer implemented object inspection method as claimed in claim 4, wherein said at least two color attributes include two of a hue, a saturation and a lightness.

* * * * *